(12) United States Patent
Yeung et al.

(10) Patent No.: US 6,587,944 B2
(45) Date of Patent: *Jul. 1, 2003

(54) FRAGILE WATERMARKING FOR OBJECTS

(75) Inventors: Minerva M. Yeung, Sunnyvale, CA (US); Boon-Lock Yeo, Sunnyvale, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/106,786

(22) Filed: Jun. 29, 1998

(65) Prior Publication Data

US 2001/0020270 A1 Sep. 6, 2001

(51) Int. Cl.⁷ .............................. H04L 9/00; G06K 9/00; G06K 9/36; G06K 9/46
(52) U.S. Cl. ...................... 713/176; 382/100; 382/232
(58) Field of Search ...................... 713/176; 382/100, 382/232

(56) References Cited

U.S. PATENT DOCUMENTS

| 5,607,188 A | * | 3/1997 | Bahns et al. ................. 283/113 |
| 6,064,764 A | * | 5/2000 | Bhaskaran et al. .......... 382/183 |
| 6,101,602 A | * | 8/2000 | Fridrich ....................... 713/176 |
| 6,201,881 B1 | * | 3/2001 | Masuda et al. .............. 382/100 |

OTHER PUBLICATIONS

Benedens, Oliver. Geometry–Based Watermarking of 3D Models. Image Security. Jan./Feb. 1999. pp. 2–11.*

Ohbuchi, Ryutarou et al. Watermarking Three–Dimensional Polygonal Models Through Geometric and Topological Modifications. Journal on Selected Areas in Communication. vol. 16, No. 4. May 1998. pp. 551–560.*

Ohbuchi et al. Watermarking three–dimensional polygonal models. Proceedings of the conference on Multimedia '97. Nov. 1997. pp. 261–272.*

Mintzer, F.; Braudaway, G.W.; "If one watermark is good, are more better?", Acoustics, Speech, and Signal Processing, 1999. Proceedings., 1999 IEEE International Conference on. Mar. 15–19, 1999. vol. 4, pp. 2067–2069.*

"RenderSoft VRML Editor", Web Page: http://home2.pacific.net.sg/,~jupboo, (8 pgs).

"The Virtual Reality Modeling Language", International Standard ISO/IEC 14772–1:1997, The VRML Consortium Inc., 235 pgs., (1997).

Ohvuchi, R., et al., "Watermarking Three–Dimensional Polygonal Models Through Geometric and Topological Modifications", *IEEE Journal on Selected Areas In Communications*, vol. 16, No. 4, pp. 551–560, (May 1998).

Yeung, M.M., et al., "An Invisible Watermarking Technique for Image Verification", International Conference on Image Processing, IEEE Signal Processing Society vol. II of III, pp. 680–683, (Oct. 26–29, 1997).

* cited by examiner

*Primary Examiner*—Gilberto Barron
*Assistant Examiner*—Douglas J Meislahn
(74) *Attorney, Agent, or Firm*—Schwegman, Lundberg, Woessner & Kluth, P.A.

(57) ABSTRACT

Fragile watermarking for objects is disclosed. In one embodiment of the invention, a system includes an encoder and a decoder. The encoder encodes a watermark into a object, such as a three-dimensional object, in a fragile manner, utilizing a key. The decoder decodes the watermark from the object in which the watermark is encoded in a pubic manner, also utilizing a key. Visualization techniques for detecting alterations using fragile watermarking are also disclosed.

22 Claims, 5 Drawing Sheets

FRAGILE WATERMARKING FOR OBJECTS

FIELD

This invention relates generally to watermarking, and more particularly to fragile watermarking for objects.

BACKGROUND

With the increasingly popularity of computers, and with the advent of mass networks such as the Internet, electronic distribution of content, such as images, sounds and three-dimensional objects, has become much more common. However, electronic content distribution has raised concerns for the creators of such content. For example, content creators desirably wish to ensure that copyright and other authorship and ownership information is attached to their electronic content, such that subsequent attempts to determine the author and owner of the content are successful. Furthermore, the creators desirably wish to determine that their content has not been altered since first being distributed electronically.

To achieve these goals, a prior art solution is to include a header or other secondary file to the file containing the electronic content. However, this solution has disadvantages. If the header or other secondary file is not subsequently distributed with the file containing the electronic content, then all the information contained in the header or other secondary file is lost. Thus, programmers have sought to engrain the information directly into the content file itself, within the content itself, such that the information is not easily removed, and such that the information is hidden within the content, and not easily discerned without a key.

This embedding of hidden data into electronic content is generally known as digital watermarking. Digital watermarking is generally divided into two types of watermarking: robust watermarking and fragile watermarking. Robust watermarking attempts to embed information into electronic content in such a manner that subsequent attempts to rid the electronic content of the watermark, or less malicious digital processing such as applications of various compression schemes, do not remove the watermark from the electronic content. In other words, the watermarking is robust in that survivability of the watermark within the electronic content is the primary consideration.

Conversely, fragile watermarking attempts to embed information into electronic content in such a manner that subsequent attempts to rid the electronic content of the watermark specifically reflect the attempts to alter the electronic content. Thus, fragile watermarking is used in situations where the integrity of the original electronic content is important, such that attempts to subsequently alter the content are desirably easily discerned. This compares with robust watermarking, where the survivability or robustness of the watermark within the content is a main concern. In fragile watermarking, the watermark is typically sensitive for the subsequent detection of any unauthorized changes in content and the locations of change. Additionally, an important issue is that the watermarking scheme should desirably be resistant against attacks—attacks aiming to decode the watermark, or forge the watermark after unauthorized alterations. These pose as special requirements for fragile watermarking that the other watermarking techniques within the prior art have generally not been able to address adequately.

Fragile watermarking and robust watermarking, because of their different goals, employ different considerations in programming schemes to achieve their respective goals. That is, a scheme for robust watermarking is typically not applicable in the context of fragile watermarking, and vice-versa. In other words, the existence of one type of watermarking scheme for a given type of digital data—e.g., image data or sound data—does not usually assist the development of a corollary scheme for the other type of watermarking scheme.

Watermarking is also divided into public and private schemes of watermarking. A public watermarking scheme provides for detection of the watermark without the original electronic content, whereas a private watermarking scheme does not provide for watermark detection without the original content. As in the case of fragile and robust watermarking, a scheme for public watermarking is generally not applicable in the context of private watermarking, and vice-versa. Thus, the existence of a public watermarking scheme for a given type of digital data does not usually assist the development of a corollary private watermarking scheme, and vice-versa.

Furthermore, different models for watermarking are generally applicable to different types of content. Thus, a watermarking model for images is not usually applicable to three-dimensional objects or sounds. Here again, the existence of a watermarking scheme for a given type of digital data does not usually assist the development of a corollary watermarking scheme for a different type of digital data. A watermarking scheme for images, in other words, does not usually point to a similar scheme for sounds or other digital data.

Thus, there is a desire for fragile watermarking of three-dimensional objects. With the increasing speed of computers, more content creators have access to technology that allows for the creation of such three-dimensional objects. The increase in the creation and distribution of three-dimensional objects has also occurred because of the relatively recent existence of a file format standard for such objects, such as various versions of the Virtual Reality Markup Language (VRML), for example, as described in the International Standard Organization (ISO) reference entitled "International Standard ISO/IEC 14772-1:1997". Thus, the need for authors of such three-dimensional objects to detect subsequent changes of their work in a manner that fragile watermarking allows is apparent.

SUMMARY

The present invention relates to fragile watermarking for three-dimensional objects. In one embodiment of the invention, a computerized system includes an encoder and a decoder. The encoder is operative to encode a watermark into an object, such as a three-dimensional object, in a fragile manner (viz., in a manner to provide for fragile watermarking, as has been described in the background), utilizing a key. Desirably, the key and the watermark are kept secret. The decoder is operative to decode the watermark from the object in which the watermark is encoded in a public manner, also utilizing a key. In addition to this embodiment, other embodiments of the invention include computerized systems, methods, computers, and media of varying scope.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Figure 1:
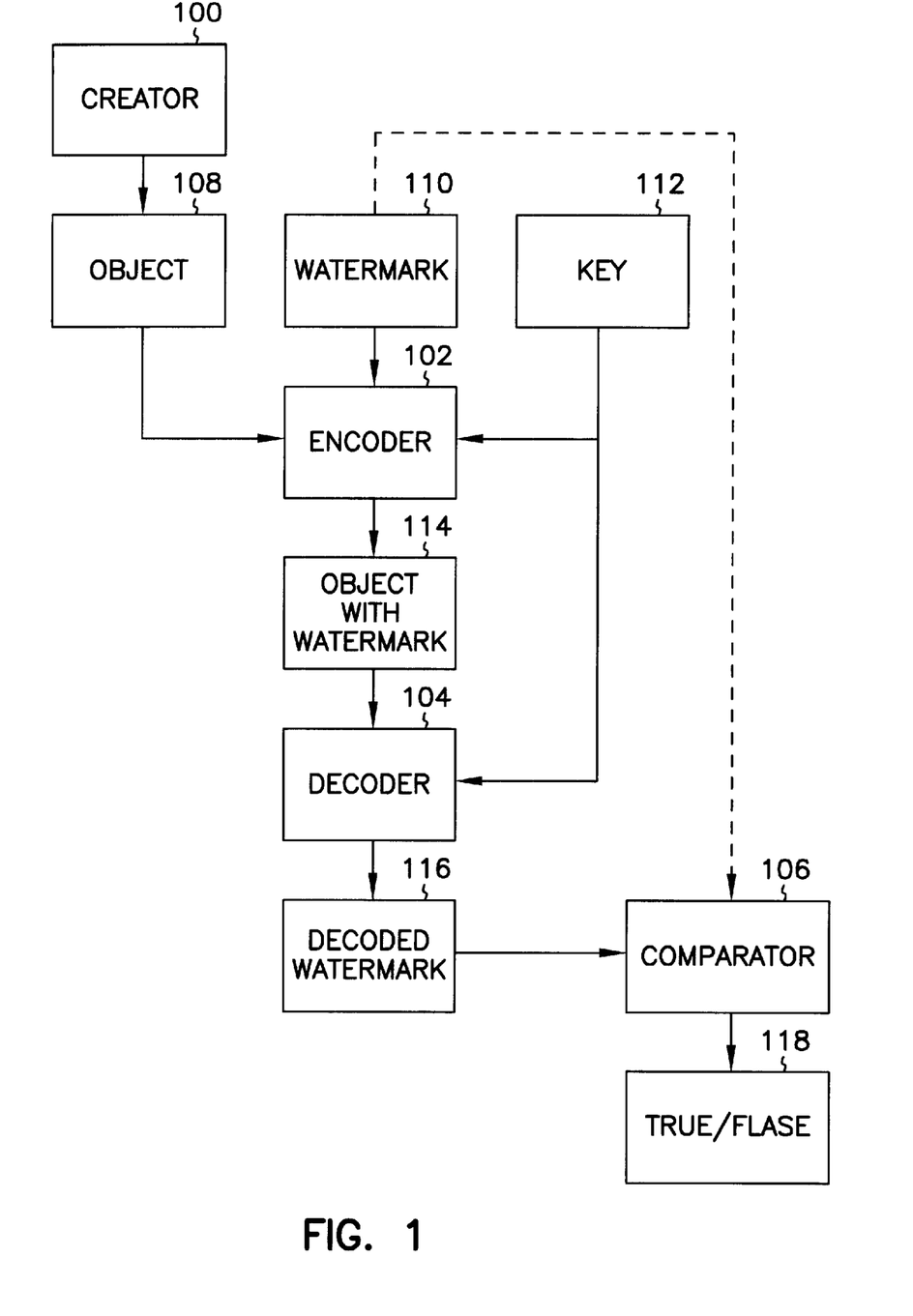
FIG. 1 shows a block diagram of a computerized system according to one embodiment of the invention.

An overview of an embodiment the invention is first provided. The overview is provided by reference to both a system according to an embodiment of the invention, and a method according to an embodiment of the invention. Referring first to FIG. 1, a block diagram of a system in accordance with an embodiment of the invention is shown. The system includes a data generator 100, an encoder 102, a decoder 104, and a verification mechanism 106. Desirably, each of the data generator 100, the encoder 102, the decoder 104, and the verification mechanism 106 is a computer program running on a computer—that is, a program executed by a processor of a computer from a computer-readable medium (e.g., a memory) thereof. The invention is not so limited, however.

The data generator 100 provides for the creation of a three-dimensional object 108 (i.e., the data generator is operative to create the three-dimensional object). For example, in one embodiment of the invention, the data generator 100 is a type of software the allows a user to create, edit and modify three-dimensional objects in Virtual Reality Markup Language (VRML) format as has been described in the background. The invention is not particularly limited to a specific type of the data generator 100; software that provides for the creation of such three-dimensional objects like the three-dimensional object 108 is readily available and known within the art. For example, such software includes the RenderSoft VRML Editor, although the invention is not so limited.

The three-dimensional object 108 is not a tangible, real-world object, but rather a virtual object defined within a computer, and is a term of art, as those of ordinary skill within the art can appreciate. The object itself may, however, mimic and approximate real-world objects, such as chairs, tables, three-dimensional environments such as cities, etc. Desirably, the three-dimensional object 108 is defined as including a set of three-dimensional points, or vertices, having connectivity properties—i.e., connected to one another in such a manner as to realize a three-dimensional object. The definition of object 108 may also be described as including a sequence of polygonal surfaces, such a sequence being itself defined as a set of three-dimensional vertices. Other descriptors of three-dimensional objects include global lighting information, color of the vertices, directions of normals, and texture, as those of ordinary skill within the art can appreciate. The three-dimensional object 108 is also desirably stored in the Virtual Reality Markup Language (VRML) format, as known within the art, although the invention itself is not so limited. Furthermore, the invention is not limited to three-dimensional objects; other objects, such as higher-dimensional polygonal models that have vertex and connectivity properties, are also amenable to the invention.

The encoder 102 encodes a watermark 110 into the object 108, utilizing a key 112, to generate a watermarked object 114 (i.e., the encoder is operative to encode the watermark into the object). The watermark 110, as those of ordinary skill within the art can appreciate, is a term of art, and has nothing to do with "water" as in the real-world context. More specifically, the encoder 102 encodes the watermark 110 into the object 108, such that subsequent attempts to alter the watermarked object 114 are easily discerned. The invention is not particularly limited to the nature of the watermark 110. In one embodiment, the watermark 110 is derived from a two-dimensional image. Utilizing a two-dimensional image as the watermark provides a visual aid for easier detection of alteration attempts of the watermarked object, as will be described. The watermarking as performed by this embodiment of the invention is fragile, as has been described in the background section (e.g., the watermark is sensitive to changes in the underlying content, the watermarked object 114).

The key 112 is desirably a set of lookup tables, as known within the art, including binary entries, that specifies how the watermark 110 is to be encoded into the object 108, within the scheme as provided by the encoder 102. The key 112 thus provides for different manners by which a given watermark may be encoded into a given three-dimensional object, even within the same scheme as provided by a given encoder. The invention is not limited to a particular type of key. The key 112 may also be derived from the watermark 110 itself, for example. The invention is also not limited to the scheme by which the encoder 102 encodes the watermark 110 into the object 108 in a fragile manner. Desirably, both the key 112 and the watermark 110 are kept secret.

The decoder 104 decodes a decoded watermark 116 from the watermarked object 114, utilizing the key 112 (i.e., the decoder is operative to decode the decoded watermark from the watermarked object). More specifically, the decoder 104 decodes the decoded watermark 116 from the watermarked object 114 in a public manner, such that the (original) object 108 is not employed. Thus, if the watermarked object 114 has not been altered, via digital processing either with or without malicious intent, then the decoded watermark 116 will be substantially the same as the (original) watermark 110. The invention is not limited to the manner by which the decoder 104 decodes the decoded watermark 116 from the watermarked object 114 in a public manner.

The verification mechanism 106 determines whether the decoded watermark 116 is substantially the same as the (original) watermark 110, generating a true or false flag 118 depending on whether the decoded watermark 116 is or is not the same as the (original) watermark 110 (i.e., the mechanism is operative to determine whether the decoded watermark is substantially the same as the original watermark). That is, the verification mechanism 106 verifies the decoded watermark, desirably with the (original) watermark 110, (in the sense that each vertex of the watermarked object is determined to be valid or invalid, as will be described) although the invention is not so limited. For example, in the case where the (original) watermark 110 and the decoded watermark 116 are two-dimensional images, the verification mechanism 106 may display the decoded watermark 116 to a user, such that the user by visual inspection may determine whether the decoded watermark 116 is identical to the (original) watermark 110. In such a case, the (original) viatermark 110 may not be required for comparison by the verification mechanism 106.

Furthermore, the verification mechanism 106 desirably permits the user to determine where the three-dimensional watermarked object 114 has been modified vis-a-vis the (original) three-dimensional object 108 in the case where the decoded watermark 116 does not match the watermark 110. This is useful for discerning the extent to or the manner by which alteration was attempted; that is, such visualization enables a user to determined detected alternations made to the watermarked object 114. For further example, in the case where the (original) watermark 110 and the decoded watermark 116 are two-dimensional images, the user may select a part of the decoded watermark 116, and the verification mechanism 106 may display to the user where within the watermarked object 114 that part of the decoded watermark 116 was encoded (for example, on a monitor or display of a computer). As described herein, embodiments of the invention detect modifications and alterations made to the watermarked object 114 including cropping, as this term is known within the art.

Figure 2:
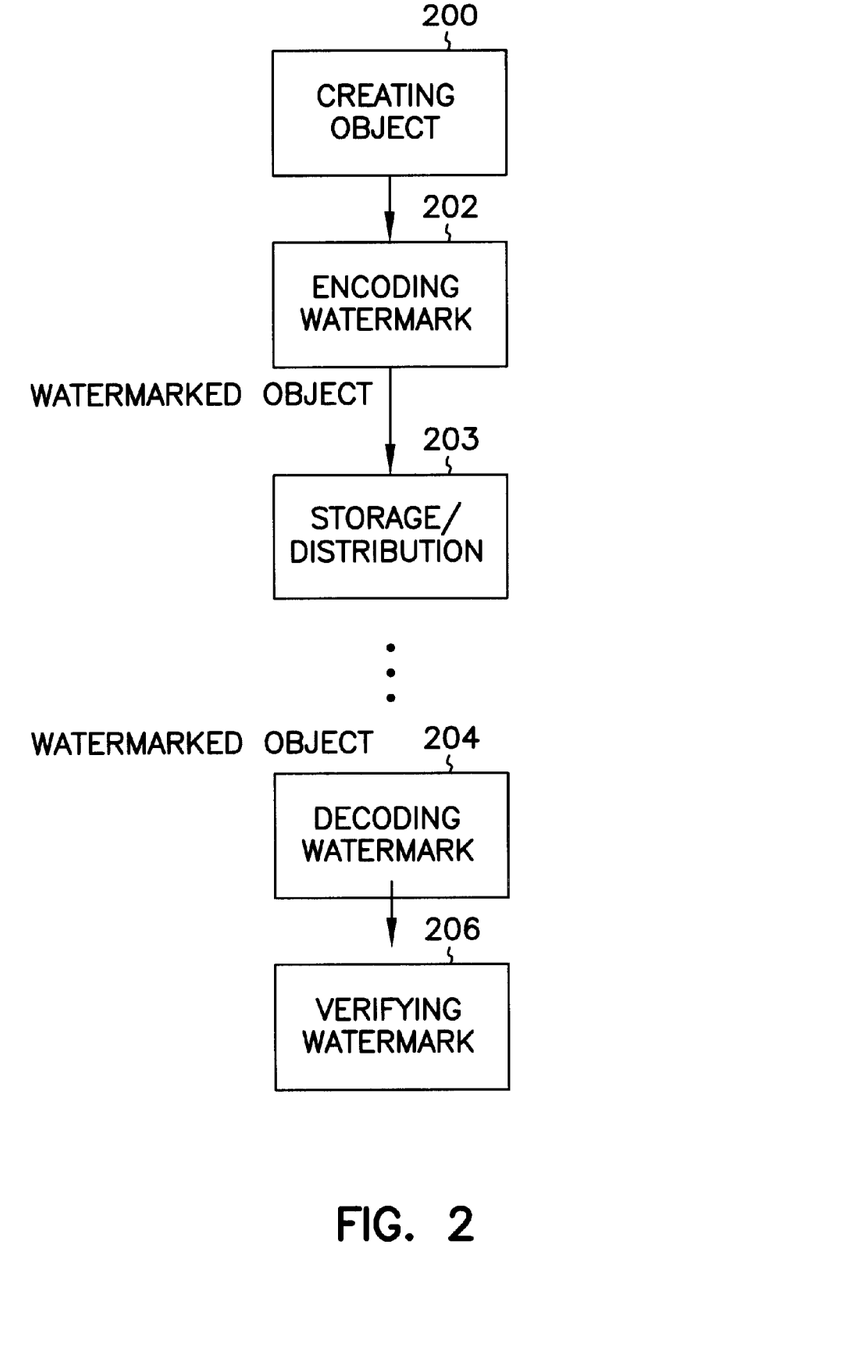
FIG. 2 shows a flowchart of a method according to one embodiment of the invention.

Referring next to FIG. 2, a flowchart of a method in accordance with an embodiment of the invention is shown. The method may be desirably realized at least in part as one or more programs capable of running on a computer—that is, as a program executed from a medium such as a memory by a processor, that may be part of a computer. The programs are desirably storable on a medium such as a floppy disk or a CD-ROM, for distribution and installation and execution on another (suitably equipped) computer, in one embodiment.

In 200, an object into which a watermark is to be encoded is created. In one embodiment, the object is created utilizing software for such a purpose, as has been described. Desirably the object is a three-dimensional object, although the invention is not so limited. Also desirably, the three-dimensional object is defined as a set of three-dimensional points, or vertices, as has been described. The creation of the three-dimensional object may be performed in accordance with software for such purposes known and available within the art. The invention is not particularly limited to a given manner of creation.

In 202, a watermark is encoded within the three-dimensional object created in 200. The watermark is encoded in a fragile manner, such that subsequent attempts to alter the watermark-encoded object are easily discernable. Encoding is accomplished using a key. The invention is not limited to the manner by which encoding in a fragile manner is performed; the invention is also not limited to a given type of key. In one embodiment, the watermark is a two-dimensional image.

In 203, the watermarked object is placed on a storage medium, such as on a floppy disk or a compact-disc read-only-memory (CD-ROM) for distribution, or is distributed via a network such as a local-area network (LAN) or the Internet. The dotted line between 203 and 204 thus indicates that the creation and encoding of the watermark as represented in 200 and 202 are typically performed by different users than are the acts and/or steps represented in 204 and 206 (i.e., decoding the watermark and verifying the watermark). Thus, one user typically creates an object and encodes a watermark therein, and after the watermarked object has been distributed, it may be the case that another user decodes and verifies the watermark. The acts and/or steps represented in 203, however, are not required by the invention.

In 204, a decoded watermark is decoded from the watermarked three-dimensional object, as watermarked in 202. The decoding is performed in a public manner, such that the original object (without a watermark) is not employed for the decoding process. The decoding is accomplished using the same key as in 202. If the watermarked object was not altered after watermarking in 202, then in 204 the watermark decoded from the watermarked object will be substantially identical to the watermark encoded in the original object in 202.

In 206, the watermark decoded in 204 is verified to determine whether it is substantially identical to the watermark encoded in 202, in the sense that each vertex of the watermarked object is determined to be valid or invalid, as will be described. In one embodiment, the verification process includes verifying the decoded watermark with the original watermark, although the invention is not so limited. In an embodiment of the invention, where the decoded and original watermarks are two-dimensional images, the verification process may include displaying the decoded watermark for visual inspection by a user. In such an embodiment, it may be the case that more than one vertex (as will be described) is mapped to the same two-dimensional location of the watermark, such that the bit will be changed if at least one vertex is invalid (as will be described). The value of having watermarks that are two-dimensional images is that the display therefor provides for fast visualization of the modifications to the watermark and the extent of the modifications made, which is easier than manipulating the objects in three dimensions, as those of ordinary skill within the art can appreciate.

As described in conjunction with FIG. 1 and FIG. 2, this embodiment of the invention provides for fragile watermarking of a three-dimensional object. This provides this embodiment of the invention with advantages not found in the prior art. First, this embodiment provides for fragile watermarking of three-dimensional objects where such watermarking for such types of electronic content did not before exist. Second, the fragile nature of the watermark permits easy detection of nearly any attempt to modify the watermarked three-dimensional object, either with or without malicious intent (e.g., intent to remove the watermark from the object, or intent to just digitally process the object without specific intent to remove the watermark).

Another specific embodiment of the invention is now described. This specific embodiment recites a particular scheme for encoding, decoding and verifying fragile watermarks within three-dimensional objects. Those of ordinary skill within the art can appreciate, however, that the invention is not limited to this specific embodiment. The description of this specific embodiment provided herein includes references to what may be construed as intangible subject matter, such as three-dimensional objects, vertices, indices, surfaces, and operations performed on such subject matter, such as computations and calculations. Such description is provided for purposes of clarity in describing this embodiment. Those of ordinary skill within the art can appreciate, however, that such subject matter is in fact tangible subject matter, such as storage media (e.g., memory, floppy disks, etc.) storing data representing such subject matter, and signals (e.g., between different circuits of a semiconductor memory) representing such subject matter. The invention is not limited as to a particular tangible implementation of the specific embodiment described herein.

Figure 3:
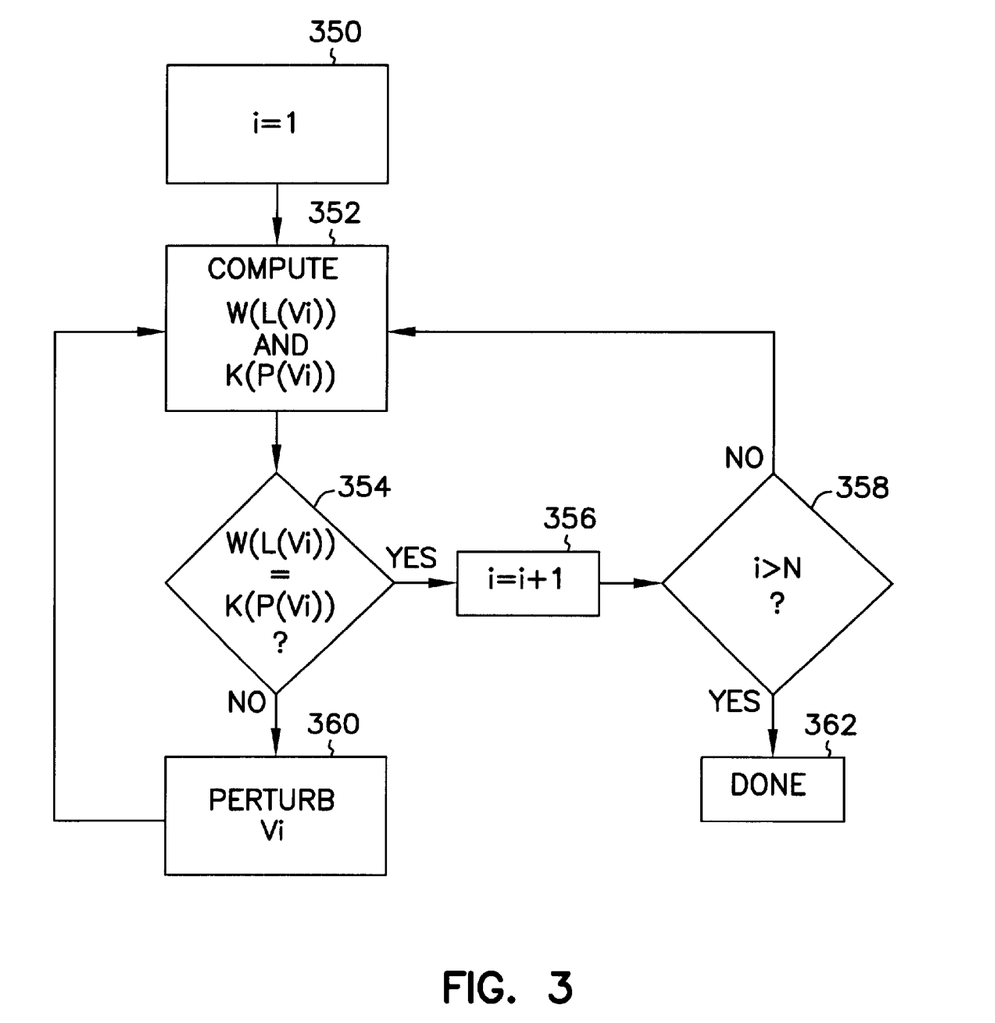
FIG. 3 shows a flowchart of a method to encode a watermark into a three-dimensional object, according to a specific embodiment of the invention.

Therefore, referring first to FIG. 3, a flowchart of a method to encode a watermark into a three-dimensional object, according to a specific embodiment of the invention, is shown. The method of FIG. 3 assumes a starting point of a three-dimensional object having a set of three-dimensional vertices v1, v2, . . . , vN described by a sequence of surfaces S1, S2, . . . . In 350, a counter variable i is set to one, to start with the first vertex vi=v1. In 352, a value from a watermark W={w1, w2, . . . } from the location index L(v) at L(vi) is computed, and a key K={k1, k2, . . . } for a value index p(v) at p(vi) is computed. The location index L(v) is used to index the watermark W for extraction of the bit value W(L). W(L(vi)) is computed by looking up within the desired watermark the location L(vi). The value index p(v) is used to extract the bit from the key K at location p, K(p). The key K is desirably three separate look-up tables: K1, K2 and K3, each with 256 binary entries. Thus, the value at K(p) is computed as K1(p1)⊕K2(p2)⊕K3(p3), where ⊕ denotes binary XOR.

The invention is not particularly limited to a specific manner by which to calculate the value index and the location index. However, in one embodiment, the value index and the location index are calculated as follows. The value index is generated by taking the three-dimensional coordinates of point (vertex) vi and mapping it into a three-tuple of integers, denoted by p(vi)=(p1, p2, p3). Any function for scaling a floating point representation to integers, such as Scale( ), as known within the art, may be used for this purpose. Thus, p1=Scale1(vx), p2=Scale2(vy), and p3=Scale3(vz). The value p is analogous in one embodiment to the color information of a pixel value, for example, the color information regarding the pixel value of one or more pixels making up a given three-dimensional object as displayed on a display of a computer (although the invention is not so limited).

The location index is generated by a three-step process. First, the set N(vi) including the vertex vi and its earlier-traversed neighbors (which are defined to be those vj connected to vi such that j<I) is found. Then, the three-dimensional coordinates of point (vertex) vi are combined and hashed to produce a location index L(vi). In other words:

$$s = (s_x, s_y, s_z) = \frac{1}{|N(v_i)|} \sum_{\mu \in N(v)} \mu$$

$$L_x = f_x(N_x, N_y, N_z); L_y = f_y(N_x, N_y, N_z)$$

$$N_x = \text{Scale}(s_x); N_y = \text{Scale}(s_y); N_z = \text{Scale}(s_z)$$

Thus, in this embodiment, first the centroid of the points (vertices) in N(vi) is found—the list of three-dimensional coordinates is combined into a three-tuple. Alternatively to a centroid, methods such as the median and mode may also be employed. Next, the centroid is converted into integers through the Scale( ) routine, or another applicable routine. Finally, the three integers derived are combined to obtain Lx and Ly. Therefore, a mapping is provided from the centroid (or other combinations) of the points (vertices) in N(vi) to a discrete two-dimensional grid. The location on the grid is denoted by the location index L. The location L is analogous to the pixel location of a pixel.

In 354, it is checked whether the watermark as to the location index at point (vertex) vi is substantially equal to the key as to the value index at point (vertex) vi. In other words, it is checked whether W(L(vi))=K(p(vi)). The encoding process, thus, is such that this relationship holds for substantially every three-dimensional point (vertex) vi within the object. That is, the watermark as to a location index for the set of three-dimensional points (vertices) may be substantially equal to the key as to a value index for the set of three dimensional points (vertices). If W(L(vi))=K(p(vi)) for the current vi, then I is incremented by one in 356, and assuming that I is not greater than the total number of vertices in 358, control proceeds back to 352 for the next vertex.

If in 354, the watermark as to the location index at point (vertex) vi is not equal to the key as to the value index at point (vertex) vi, then control proceeds to 360, where the point (vertex) vi is perturbed. The perturbation process involves changing the three-dimensional point (vertex) vi=(xi, yi, zi) to vi'=(xi', yi', zi') by moving one of the individual coordinates xi, yi or zi by a small Δ (delta). Control then proceeds back to 352, to recompute W(L(vi)) and K(p(vi)) for the perturbed vi. If W(L(vi)) still does not equal K(p(vi)) in 354, then vi is perturbed again in 360. This iterative process is continued until the relationship in 354 holds true. Thus, once all the vertices of the three-dimensional object have been processed such that W(L)=K(p) for substantially the entire location index L and substantially the entire value index p, then I is incremented in 356 such that I>N at 358, and the process is done in 362.

Figure 4:
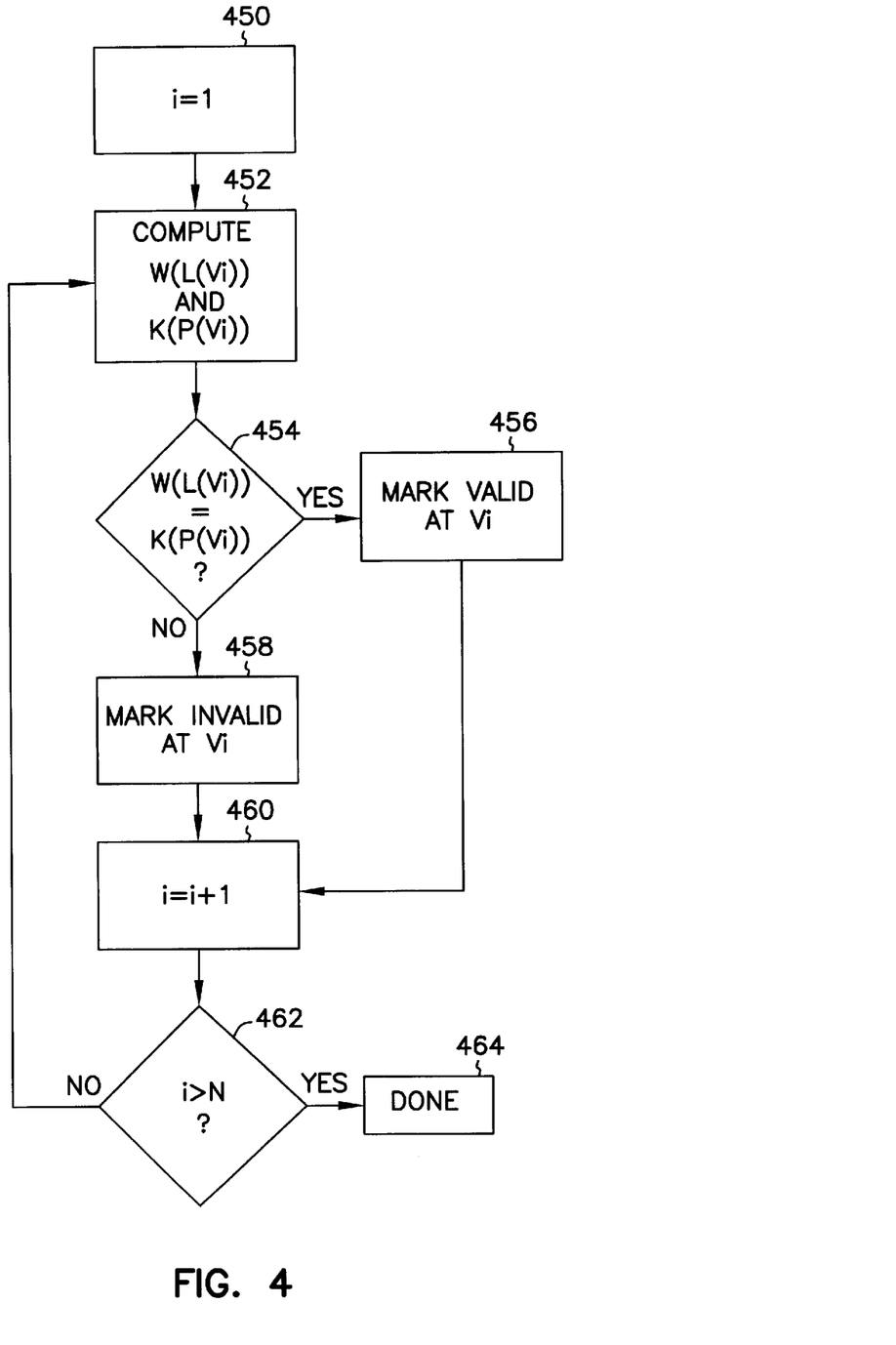
FIG. 4 shows a flowchart of a method to decode and verifies a watermark from a watermarked three-dimensional object, according to a specific embodiment of the invention; and, FIG. 5 shows a block diagram of a representative computer in conjunction with which embodiments of the invention may be practiced.

An embodiment decoding and verifying method similar to the encoding embodiment of FIG. 3 is shown in FIG. 4. Referring now to FIG. 4, a flowchart of a method to decode and verify a watermark from a watermarked three-dimensional object, according to a specific embodiment of the invention, is shown. The embodiment of FIG. 4 assumes a starting point of a watermarked three-dimensional object having a set of vertices v1, v2, . . . , vN described by a sequence of surfaces S1, S2 . . . . In 450, a counter variable I is set to one, to start with the first vertex vi=v1. In 452, a value from a watermark W={w1, w2 . . . } from the location index L(v) at L(vi) is computed, and a key K={k1, k2 . . . } for a value index p(v) at p(vi) is computed. The watermark W at L(vi) is computed in the sense that it is decoded from the watermarked object. This is accomplished first by the calculation of the location index L(v) at vertex vi, and the calculation of the value index p(v) at vertex vi. The value of the object at L(vi) is thus the decoded watermark W(L(v)) at this vertex vi. The value K(p(vi)) is calculated by looking up the value of the key at p(vi). L(vi) and p(vi) are computed as has been already described.

In 454, it is checked whether the watermark decoded as to the location index at point (vertex) vi is substantially equal to the key as to the value index at point (vertex) vi. In other words, it is checked whether W(L(vi))=K(p(vi)). The decoding and verifying process, thus, is such that it is checked whether this relationship holds for substantially every three-dimensional point (vertex) vi within the object. That is, the watermark as to a location index for the set of three-dimensional points (vertices) should desirably be equal to the key as to a value index for the set of three dimensional points (vertices) for the watermark to be deemed valid. If the relationship does not hold for substantially all the points (vertices), then it may be deemed that the watermark is not valid—i.e., that the watermarked object has been altered since having been watermarked.

Thus, if in 454 W(L(vi))=K(p(vi)), then in 455 the watermark at point (vertex) vi is deemed valid; otherwise, in 456 the watermark at point (vertex) vi is deemed invalid. From either 454 or 456, I is incremented by one in 460, and assuming that I is not greater than the total number of vertices in 462, control proceeds back to 452. Thus, once all the vertices of the three-dimensional object have been processed such that W(L)=K(p) has been checked for substantially the entire location index L and substantially the entire value index p, then I is incremented in 458 such that I>N at 462, and the process is done in 464.

In an alternative embodiment of the invention, W(L(vi)) is computed for substantially every vertex vi—that is, the watermark is computed for substantially every vertex vi—and the resulting decoded watermark is displayed to the user. This alternative embodiment assumes that the decoded watermark is a two-dimensional image, such that visual inspection by the user is able to determine whether or not the object has been modified, without looking at the object. In such a situation, the process of FIG. 4 may be only a decoding process. Furthermore, the user may be able to click on a point (vertex) of the watermark—i.e., a W(L(vi))—and is able to see on the watermarked object the vertices v's to which these points (vertices) of the watermark correspond. Thus, in this manner, the user is able to determine where within the object the object has been altered.

As has been described in conjunction with FIGS. 3 and 4, embodiments of the invention provide for detection of alterations and modifications made to the watermarked object including cropping, as this term is known within the art. Protection against cropping (i.e., detection of cropping attempts) results from the form of dependencies built in when the location index is computed; when a neighboring vertex u of a vertex v is removed, a different L results. However, in an alternative embodiment of the invention, further protection as to detection of cropping may also be added, by making the computation of the position index p(v) also dependent on the neighbors of vertex v. Thus, where N(vi) is defined as the set of earlier neighbors of the vertex vi, as well as vi itself, or, {u1, u2, . . . , uMi} (where uMi is the last neighbor of vertex vi), and p(vi) is defined as {p1(vi), p2(vi), p3(vi) . . . }, then K(p(vi)) may instead be computed as K1(p1(u1))⊕K2(p2(u1))⊕K3(p3(u1))⊕K1(p1 (u2))⊕K2(p2(u2))⊕K2(p2(u2))⊕K3(p3(u2))⊕ . . . ⊕K1(p1 (uMi))⊖K2(p2(uMi))⊖K3(p3(uMi)), where ⊕ denotes binary XOR. Thus, the look-up table K is applied not just to the position indices of the current vertex vi but also to all of its earlier neighbors; when some of the neighbors are missing—e.g., due to cropping, different K(p(vi)) are obtained. Those of ordinary skill within the art will appreciate, however, that the invention is not limited to this alternative embodiment.

Figure 5:
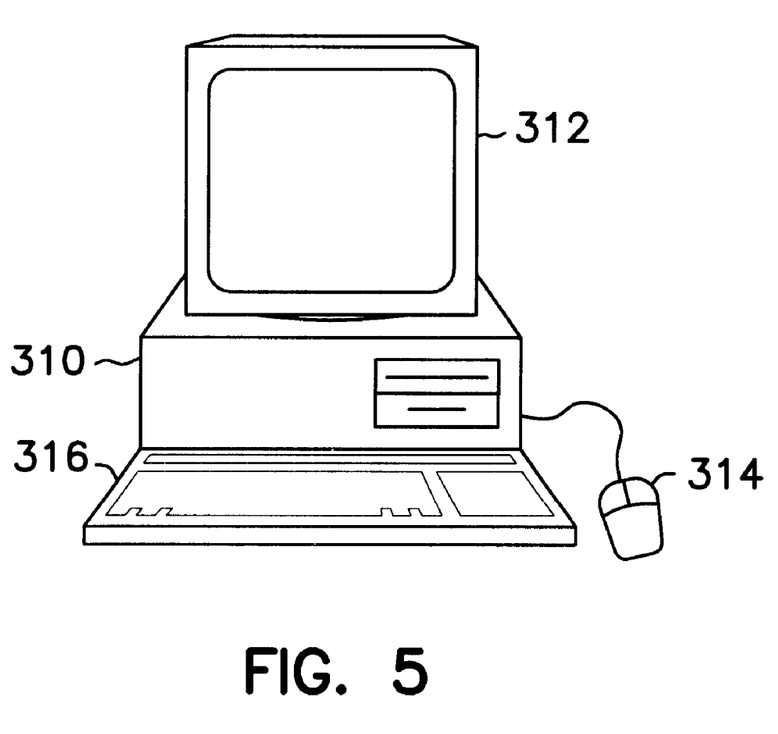

A representative computer in conjunction with which embodiments of the invention may be practiced is now described. Referring to FIG. 5, a diagram of such a computer is shown. Computer 310 is operatively coupled to monitor 312, pointing device 314, and keyboard 316. Computer 310 includes a processor (for example, a Pentium® II processor available from Intel Corp.), random-access memory (RAM) (for example, at least thirty-two megabytes), read-only memory (ROM), and one or more storage devices, such as a hard disk drive, a floppy disk drive (into which a floppy disk can be inserted), an optical disk drive, and a tape cartridge drive. The memory, hard drives, floppy disks, etc., are types of storage media. The invention is not particularly limited to any type of computer 310, or computing devices that comprise computers (e.g, set-top boxes, hand-held units, etc.). Computer 310 may be a PC-compatible computer, running a version of the Microsoft Windows operating system. The construction and operation of such computers are well known within the art.

Monitor 312 permits the display of information within a viewing area, including computer, video and other information, for viewing by a user of the computer. The invention is not limited to any particular monitor 312, and monitor 312 is one type of display device that may be used by the invention. Such monitors include cathode ray tube (CRT) displays, as well as flat panel displays such as liquid crystal displays (LCD's). Pointing device 314 permits the control of the screen pointer provided by the graphical user interface of operating systems such as versions of Microsoft® Windows®. The invention is not limited to any particular pointing device 314. Such pointing devices include mouses, touch pads, trackballs, wheels, remote controls and point sticks. Finally, keyboard 316 permits entry of textual information into computer 310, as known within the art, and the invention is not limited to any particular type of keyboard.

Fragile watermarking for objects, such as three-dimensional objects, has been described. In one embodiment, a system includes an encoder and a decoder. The encoder encodes a watermark into an object in a fragile manner, utilizing a key. The decoder decodes the watermark from the object in which the watermark is encoded in a public manner, also utilizing a key. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is manifestly intended that this invention be limited only by the following claims and equivalents thereof.

We claim:

1. A system comprising:
   an encoder to encode in a fragile manner a fragile watermark into a three-dimensional object utilizing a key, wherein the three-dimensional object is defined as including a set of three-dimensional points with connectivity properties, and wherein the fragile watermark as to a location index for the set of three-dimensional points is substantially equal to the key as to a value index for the set of three-dimensional points, wherein the location index is generated by combining three-dimensional coordinates into a three-tuple, converting the three-tuple into integers, and combining the integers; and,
   a decoder to decode in a public manner the watermark from the three-dimensional object in which the watermark is encoded utilizing the key.

2. The system of claim 1, further comprising a data generator to create the three-dimensional object.

3. The system of claim 1, wherein the three-dimensional object is in Virtual Reality Markup Language (VRML) format.

4. The system of claim 1, wherein the encoder is to encode the watermark into the three-dimensional object by perturbing the set of the three-dimensional points.

5. The system of claim 1, wherein the decoder is to decode the watermark from the three-dimensional object in which the watermark is encoded by generating a location index for the set of three-dimensional points and a value index for the set of three-dimensional points.

6. The system of claim 1, further comprising a verification mechanism to verify the watermark as decoded by the decoder.

7. The system of claim 6, wherein the verification mechanism is to determine whether the watermark as decoded by the decoder as to a location index for the set of three-dimensional points is substantially equal to the key as to a value index for the set of three-dimensional points.

8. The system of claim 1, wherein the watermark is derived from a two-dimensional image.

9. The system of claim 8, further comprising a verification mechanism to verify the watermark as decoded by the decoder.

10. The system of claim 9, wherein the verification mechanism is to display on a display the watermark as decoded by the decoder for visual inspection by a user.

11. The system of claim 10, wherein the verification mechanism is to display where the object has been modified in the case where the watermark as decoded by the decoder does not match the watermark as encoded by the encoder.

12. A computer-readable storage medium having an encoder program stored thereon for execution on a computer, the encoder program having the capability to encode in a fragile manner a fragile watermark into a three-dimensional object utilizing a key, wherein the three-dimensional object comprises a set of three-dimensional points, wherein the encoder program is to perturb the set of three-dimensional points, and wherein the watermark as to a location index for the set of three-dimensional points is substantially equal to the key as to a value index for the set of three-dimensional points, wherein the location index is generated by combining three-dimensional coordinates into a three-tuple, converting the three-tuple into integers, and combining the integers.

13. A computer-readable storage medium of claim 12 further comprising a decoder program stored thereon for execution on a computer, the decoder program having the capability to decode in a public manner the fragile watermark.

14. The computer-readable storage medium of claim 13, wherein the three-dimensional object is defined as including a set of three-dimensional points, and wherein the decoder program is to generate a location index for the set of three-dimensional points and a value index for the set of three-dimensional points.

15. A method comprising:

creating a three-dimensional object, wherein the three-dimensional object is defined as including a set of three-dimensional points; and, encoding in a fragile manner a watermark into the three-dimensional object utilizing a key, and wherein encoding the watermark into the three-dimensional object further comprises perturbing the set of three-dimensional points, wherein the watermark as to a location index for the set of three-dimensional points is substantially equal to the key as to a value index for the set of three-dimensional points, wherein the location index is generated by combining three-dimensional coordinates into a three-tuple, converting the three-tuple into integers, and combining the integers.

16. The method of claim 15, further comprising decoding in a public manner the watermark from the three-dimensional object in which the watermark is encoded utilizing the key.

17. The method of claim 16, wherein decoding the watermark comprises generating a location index for the set of three-dimensional points and a value index for the set of three-dimensional points.

18. The method of claim 16, further comprising verifying the watermark as decoded from the object in which the watermark is encoded.

19. The method of claim 18, wherein verifying the watermark comprises determining whether the watermark as decoded as to a location index for the set of three-dimensional points is substantially equal to the key as to a value index for the set of three-dimensional points.

20. The method of claim 18, wherein the watermark comprises a two-dimensional image, and wherein verifying the watermark comprises visualizing detected alterations made to the object in which the watermark is encoded.

21. A computer comprising:

a processor;

a computer-readable medium; and, an encoder program executed by the processor from the medium, the encoder program to encode in a fragile manner a fragile watermark into a three-dimensional object utilizing a key, wherein the three-dimensional object is defined as including a set of three-dimensional points and wherein the encoder program is to perturb the set of three-dimensional points, wherein the watermark sa to a location index for the set of three-dimensional points is substantially equal to the key as to a value index for the set of three-dimensional points, wherein the location index is generated by combining three-dimensional coordinates into a three-tuple, convreting the three-tuple into integers, and combining the integers.

22. A computer comprising:

a processor;

a computer-readable medium; and, a decoder program executed by the processor from the medium, the decoder program to decode in a public manner a fragile watermark from a three-dimensional object in which the watermark is fragilely encoded utilizing a key, wherein the three-dimensional object is defined as including a set of three-dimensional points, and wherein the decoder program is to generate a location index for the set of three-dimensional points and a value index for the set of three-dimensional points, wherein the location index and the value index are substantially equal, wherein the location index is generated by combining three-dimensional coordinates into a three-tuple, converting the three-tuple into integers, and combining the integers.

* * * * *

UNITED STATES PATENT AND TRADEMARK OFFICE
CERTIFICATE OF CORRECTION

PATENT NO. : 6,587,944 B2  
DATED : July 1, 2003  
INVENTOR(S) : Minerva M. Yeung and Boon-Lock Yeo It is certified that error appears in the above-identified patent and that said Letters Patent is hereby corrected as shown below:

Column 11,
Line 45, insert -- fragile -- before "watermark".

Signed and Sealed this

Tenth Day of August, 2004

JON W. DUDAS
*Acting Director of the United States Patent and Trademark Office*